US011380195B2

(12) United States Patent
Min et al.

(10) Patent No.: US 11,380,195 B2
(45) Date of Patent: Jul. 5, 2022

(54) ROAD TRAFFIC ANALYSIS METHODS AND APPARATUSES

(71) Applicant: ALIBABA GROUP HOLDING LIMITED, Grand Cayman (KY)

(72) Inventors: Wanli Min, Hangzhou (CN); Jiawei Wang, Hangzhou (CN); Zhenggang Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/542,258

(22) Filed: Aug. 15, 2019

(65) Prior Publication Data

US 2019/0371167 A1 Dec. 5, 2019

Related U.S. Application Data

(63) Continuation of application No. PCT/CN2018/075050, filed on Feb. 2, 2018.

(30) Foreign Application Priority Data

Feb. 15, 2017 (CN) ........................ 201710081074.6

(51) Int. Cl.
*G08G 1/082* (2006.01)
*G08G 1/01* (2006.01)
(Continued)

(52) U.S. Cl.
CPC ........... *G08G 1/082* (2013.01); *G08G 1/0125* (2013.01); *G08G 1/08* (2013.01); *G08G 1/083* (2013.01)

(58) Field of Classification Search
CPC ........ G08G 1/082; G08G 1/0125; G08G 1/08; G08G 1/083; G08G 1/00; G08G 1/0145
See application file for complete search history.

(56) References Cited

U.S. PATENT DOCUMENTS 7,586,421 B2 9/2009 Witte et al.
9,536,427 B2 1/2017 Tonguz et al.
(Continued)

FOREIGN PATENT DOCUMENTS

CN 101572007 A 11/2009
CN 101702262 A 5/2010
(Continued)

OTHER PUBLICATIONS

International Search Report and Written Opinion issued by the International Searching Authority in related International PCT Application No. PCT/CN2018/075050, dated Apr. 20, 2018 (8 pgs.).
(Continued)

*Primary Examiner* — Hoi C Lau
(74) *Attorney, Agent, or Firm* — Finnegan, Henderson, Farabow, Garrett & Dunner, LLP

(57) ABSTRACT

Embodiments of the present disclosure can provide a road traffic analysis method and an apparatus. The method can comprise obtaining a traffic parameter of a road intersection by analyzing road traffic information of the road intersection, determining a reference adjustment length for each phase of a traffic signal cycle corresponding to each lane of the road intersection based on the road traffic information and the traffic parameter. The traffic signal cycle has one or more phases. The method can also comprise determining a first adjustment length when a difference between the reference adjustment length and the first adjustment length satisfies a condition associated with the lanes of the road intersection and the corresponding traffic parameter, and adjusting the phases of the traffic light cycle at the road intersection based on the first adjustment length for each phase.

18 Claims, 6 Drawing Sheets

(51) Int. Cl.
*G08G 1/08* (2006.01)
*G08G 1/083* (2006.01)

(56) References Cited

U.S. PATENT DOCUMENTS

| | | | | |
|---|---|---|---|---|
| 10,037,689 | B2* | 7/2018 | Taylor | G06K 7/10475 |
| 10,115,305 | B2* | 10/2018 | Mortazavi | G08G 1/096844 |
| 10,181,263 | B2* | 1/2019 | Xu | G08G 1/0112 |
| 2002/0008637 | A1* | 1/2002 | Lemelson | G08G 1/07 340/907 |
| 2002/0065599 | A1* | 5/2002 | Hameleers | G08G 1/096861 701/117 |
| 2002/0138172 | A1* | 9/2002 | Bahri | G06Q 10/047 700/217 |
| 2008/0077316 | A1* | 3/2008 | Yamane | G01C 21/3694 701/119 |
| 2013/0342370 | A1* | 12/2013 | Sharma | G08G 1/08 340/907 |
| 2014/0149029 | A1* | 5/2014 | Sakakibara | G08G 1/0133 701/118 |
| 2016/0379486 | A1* | 12/2016 | Taylor | G01C 21/3691 340/905 |
| 2017/0178499 | A1* | 6/2017 | Dong | G08G 1/0125 |
| 2017/0278388 | A1* | 9/2017 | Bansal | G08G 1/0145 |
| 2017/0345297 | A1* | 11/2017 | Umehara | H04W 4/44 |
| 2018/0061230 | A1* | 3/2018 | Madigan | B60W 40/09 |
| 2018/0061232 | A1* | 3/2018 | Madigan | B60W 40/09 |
| 2018/0096597 | A1* | 4/2018 | Mortazavi | H04W 4/023 |
| 2018/0151064 | A1* | 5/2018 | Xu | G08G 1/0116 |
| 2019/0114908 | A1* | 4/2019 | Xu | G08G 1/0116 |
| 2019/0122546 | A1* | 4/2019 | Lu | G08G 1/056 |
| 2019/0206245 | A1* | 7/2019 | Royal | G08G 1/08 |
| 2019/0371167 | A1* | 12/2019 | Min | G08G 1/0145 |
| 2020/0047771 | A1* | 2/2020 | Yoon | B60W 60/001 |
| 2020/0118427 | A1* | 4/2020 | Zheng | G08G 1/0145 |
| 2020/0135019 | A1* | 4/2020 | Hirotsu | G08G 1/08 |
| 2020/0152059 | A1* | 5/2020 | Cohen | G01C 21/3691 |
| 2020/0211374 | A1* | 7/2020 | Liu | G08G 1/0145 |

FOREIGN PATENT DOCUMENTS

| | | | |
|---|---|---|---|
| CN | 202142192 | U | 2/2012 |
| CN | 102436740 | A | 5/2012 |
| CN | 102610094 | A | 7/2012 |
| CN | 102938210 | A | 2/2013 |
| CN | 103473935 | A | 12/2013 |
| CN | 103871258 | A | 6/2014 |
| CN | 103914988 | A | 7/2014 |
| CN | 104240505 | A | 12/2014 |
| CN | 104778848 | A | 7/2015 |
| CN | 104851285 | A | 8/2015 |
| CN | 104966403 | A | 10/2015 |
| CN | 105070056 | A | 11/2015 |
| CN | 105303850 | A | 2/2016 |
| CN | 105551269 | A | 5/2016 |
| CN | 106023590 | A | 10/2016 |
| CN | 205644974 | U | 10/2016 |
| CN | 106327863 | A | 1/2017 |
| CN | 106355885 | A | 1/2017 |
| KR | 20020030327 | A | 4/2002 |

OTHER PUBLICATIONS

First Office Action issued by the Chinese Patent Office in related Application No. CN 201710081074.6, dated Sep. 9, 2020 (20 pgs.).
First Search Report issued by the Chinese Patent Office in related Application No. CN 201710081074.6, dated Sep. 9, 2020 (2 pgs.).
First Chinese Search Report issued in corresponding Chinese Application No. 201710081074.6 dated Jul. 28, 2021 (2 pages).

* cited by examiner

ROAD TRAFFIC ANALYSIS METHODS AND APPARATUSES

CROSS-REFERENCE TO RELATED APPLICATION

The present application claims the benefits of priority to International Application No. PCT/CN2018/075050, filed on Feb. 2, 2018, which claims priority to Chinese Patent Application No. 201710081074.6 filed on Feb. 15, 2017, both of which are incorporated herein by reference in their entireties.

TECHNICAL FIELD

The present disclosure relates to the field of intelligent traffic, and specifically relates to a road traffic analysis method. The present disclosure also relates to road traffic analysis methods and apparatuses.

BACKGROUND

With the rapid development of economics and continuous improvement of living standards, the number of motor vehicles has increased rapidly. Private cars are constantly swarming into limited urban traffic networks, bringing tremendous pressure to the urban traffic networks, and many problems to road intersections in the urban traffic networks. A road intersection, as a junction of two or more roads, is a necessary place for vehicles and pedestrians to gather, turn and evacuate. It is also the throat of an urban traffic network. If traffic signal control at a road intersection is unreasonable, it is likely that passing vehicles will frequently encounter red lights, resulting in time delay and unnecessary fuel consumption. At the same time, it will aggravate air and noise pollution, and may even make drivers agitated, thus causing traffic accidents. Therefore, the road traffic control at road intersections appears to be particularly important.

At present, when collecting traffic information of road intersections in a traffic network, traffic information of each road section in the traffic network is collected by distributing traditional data collection devices such as fixed video cameras, coils and microwaves in the traffic network according to actual situations of the road intersections. However, due to high investment cost and maintenance cost, the density of traditional data collection devices in a traffic network is relatively low, resulting in a relatively high data loss rate of the collected traffic information. Since traditional data collection devices such as fixed coils or video cameras can only collect information of limited local areas due to quite a few collection blind spots, causing increasing uncertainty of sample data obtained through collection. Accordingly, improvements are needed.

SUMMARY

Embodiments of the present disclosure provide a road traffic analysis method and a road traffic analysis apparatus, another road traffic analysis method and apparatus.

The road traffic analysis method can comprise obtaining a traffic parameter of a road intersection by analyzing road traffic information of the road intersection, determining a traffic unbalance index of the road intersection based on the road traffic information and the traffic parameter, and in response to a determination that the traffic unbalance index satisfies a traffic unbalance threshold, identifying the road intersection as an unbalanced intersection with unbalanced road traffic.

In some embodiments, after obtaining a traffic parameter of a road intersection by analyzing road traffic information of the road intersection, and before determining a traffic unbalance index of the road intersection based on the road traffic information and the traffic parameter, processing the road traffic information and the traffic parameter, wherein before being processed, the road traffic information and the traffic parameter are associated with a first time period, and after being processed, the road traffic information and the traffic parameter are associated with a second time period, the second time period is longer than the first time period.

In some embodiments, after obtaining a traffic parameter of a road intersection by analyzing road traffic information of the road intersection, and before determining a traffic unbalance index of the road intersection based on the road traffic information and the traffic parameter, optimizing at least one of the road traffic information or the traffic parameter based on a parameter that is related to a structure of the road intersection, wherein the parameter is contained in at least one of the road traffic information or the traffic parameter.

In some embodiments, determining the traffic unbalance index of road traffic of the road intersection based on the road traffic information and the traffic parameter comprises: determining first unbalance indexes of lanes based on the road traffic information and the traffic parameter, determining second unbalance indexes of traffic stream directions based on the first unbalance indexes of the lanes, and determining the traffic unbalance index of the road intersection based on the second unbalance indexes of the traffic stream directions.

In some embodiments, the first unbalance index of the lane is determined based on a difference between a normalized upstream traffic speed and a normalized downstream traffic speed of the lane, the normalized upstream traffic speed of the lane is obtained by normalizing a traffic speed of the upstream section of the lane, and the normalized downstream traffic speed of the lane is obtained by normalizing a traffic speed of the downstream section of the lane.

In some embodiments, the traffic speed of the upstream road section of the lane is normalized by dividing the traffic speed of the upstream road section of the lane by a reference speed of the lane to obtain the normalized upstream traffic speed of the lane.

In some embodiments, the traffic speed of the downstream road section of the lane is normalized by dividing the traffic speed of the downstream road section of the lane by a reference speed of the lane to obtain the normalized downstream traffic speed of the lane.

In some embodiments, the second unbalance index of the traffic stream direction is determined based on a weighted sum of the first unbalance indexes of all lanes in the traffic stream direction, the weight of the weighted sum being a proportion that traffic volume of each lane accounts for in traffic volume of all lanes having the same direction.

In some embodiments, determining the traffic unbalance index of the road intersection based on the second unbalance indexes of the traffic stream directions comprises: determining a traffic unbalance index of the road intersection based on weighted sums of the second unbalance indexes of all traffic stream directions having a same phase in a traffic signal cycle of the road intersection along with a sum of absolute values of the weighted sums, wherein the traffic signal cycle has one or more phases; wherein the weight of the second unbalance index is a proportion that the traffic volume of each traffic stream direction accounts for in traffic volume of all traffic directions having the same phase.

In some embodiments, determining the traffic unbalance index of the road intersection according to the second unbalance indexes of the traffic stream directions comprises one of: determining the traffic unbalance index of the road intersection based on a sum of absolute values of second unbalance indexes of all traffic stream directions of the road intersection, each traffic direction having opposite phases in a traffic light cycle of the road intersection, or determining the traffic unbalance index of the road intersection according to a weighted sum of second unbalance indexes of all traffic stream directions having opposite phases in a traffic light cycle of the road intersection, wherein the weight of the weighted sum of the second unbalance index is a proportion that traffic volume of each traffic direction accounts for in total traffic volume of the road intersection.

In some embodiments, the road traffic information comprises at least one of: a travel speed of a vehicle traveling at the road intersection, time information corresponding to the travel speed, a name of the city to which the road intersection belongs, an identification code of the city, a name of an entrance road section, a name of an exit road section, a name of the road intersection, attributes of the road intersection, a road node identifier in an electronic map, a sheet number of the road node, a sheet number of the entrance road section, a road section identifier of the entrance road section, a sheet number of the exit road section, a road section identifier of the exit road section, a road direction of the entrance road section, a road direction of the exit road section, an entrance angle of the entrance road section, an exit angle of the exit road section, or a geographical area where the road intersection is located.

In some embodiments, the traffic parameter comprises at least one of: a traffic speed of a upstream road section of each lane in each traffic stream direction at the road intersection, a traffic speed of a downstream road section of each lane in each traffic stream direction at the road intersection, a first time period associated with each travel speed, a vehicle travel direction of the lane, one of a weekday or a weekend corresponding to the first time period, total traffic volume of the lane on all weekdays, or total traffic volume of the lane on all weekends, wherein the vehicle travel direction comprises turning left, turning right, going straight and turning around.

In some embodiments, in response to a determination that the traffic unbalance index does not satisfy the traffic unbalance threshold, obtaining a traffic parameter of a road intersection that has not been identified in a traffic network containing at least one road intersection by analyzing road traffic information of the road intersection.

In some embodiments, after identifying the road intersection as an unbalanced intersection with unbalanced road traffic, determining, based on at least one of the road traffic information or the traffic parameter, a reference adjustment length for each phase of each lane of the road intersection; determining a first adjustment length when a difference between the reference adjustment length and the first adjustment length satisfies a condition associated with the lanes of the road intersection and the corresponding traffic parameter; and adjusting the phases of the traffic light cycle at the road intersection based on the first adjustment length for each phase.

In some embodiments, the reference adjustment length for each phase of the lane is determined based on a product of a speed difference times a phase adjustment coefficient, the speed difference being a difference between a traffic speed of the upstream road section and a traffic speed of the downstream road section of the lane.

In some embodiments, at least one of the reference adjustment length or the first adjustment length is determined using a phase adjustment model, and the phase adjustment coefficient is obtained through learning and training with the phase adjustment model.

In some embodiments, a sum of the first adjustment length of each phase in a phase cycle for the lane in the traffic signal cycle equals 0.

In some embodiments, a road traffic analysis platform includes a data acquisition interface for acquiring the road traffic information, a road traffic analysis interface for accessing and outputting the first adjustment length for each phase of the road intersection, and a data upload interface for uploading the road traffic information.

In some embodiments, the road traffic information is acquired from at least one of navigation data of the road intersection or road traffic data, the navigation data is acquired from a third-party map service provider through the data acquisition interface, and the road traffic data is received through the data upload interface and uploaded by a traffic data collection device provided at the road intersection.

In some embodiments, the road traffic analysis platform adjusts the phases at the road intersection based on the first adjustment length received from the road traffic analysis interface for each phase at the road intersection, and an interface protocol of traffic signal lights at the road intersection Embodiments of the present disclosure also provide a road traffic analysis apparatus. The apparatus can comprise a memory storing a set of instructions, and one or more processors configured to execute the set of instruction to cause the apparatus to perform: obtaining a traffic parameter of a road intersection by analyzing road traffic information of the road intersection, determining a traffic unbalance index of the road intersection based on the road traffic information and the traffic parameter, and in response to a determination that the traffic unbalance index satisfies a traffic unbalance threshold, identifying the road intersection as an unbalanced intersection with unbalanced road traffic.

Embodiments of the present disclosure also provide a road traffic analysis method. The method can comprise: obtaining a traffic parameter of a road intersection by analyzing road traffic information of the road intersection; determining a reference adjustment length for each phase of a traffic signal cycle corresponding to each lane of the road intersection based on the road traffic information and the traffic parameter, wherein the traffic signal cycle has one or more phases; determining a first adjustment length when a difference between the reference adjustment length and the first adjustment length satisfies a condition associated with the lanes of the road intersection and the corresponding traffic parameter; and adjusting the phases of the traffic light cycle at the road intersection based on the first adjustment length for each phase.

In some embodiments, the reference adjustment length for each phase of the lane is determined based on a product of a speed difference times a phase adjustment coefficient, the speed difference being a difference between a traffic speed of a upstream road section and a traffic speed of a downstream road section of the lane.

In some embodiments, at least one of the reference adjustment length or the first adjustment length is determined based on a phase adjustment model, and the phase adjustment coefficient is obtained through learning and training with the phase adjustment model.

In some embodiments, a sum of the first adjustment length for each phase for the lane in the traffic signal cycle equals 0.

In some embodiments, adjusting the phases at the road intersection based on the first adjustment length for each phase of the road intersection comprises: determining a traffic unbalance index of the road intersection based on the road traffic information and the traffic parameter; in response to a determination that the traffic unbalance index satisfies a traffic unbalance threshold, identifying the road intersection as an unbalanced intersection with unbalanced road traffic; and in response to the road intersection being identified as the unbalanced intersection, adjusting the phases at the road intersection based on the first adjustment length for each phase of the road intersection.

In some embodiments, determining the traffic unbalance index of the road intersection based on the road traffic information and the traffic parameter comprises: determining first unbalance indexes of lanes based on the road traffic information and the traffic parameter; determining second unbalance indexes of traffic stream directions based on the first unbalance indexes of the lanes; and determining the traffic unbalance index of the road intersection based on the second unbalance indexes of the traffic stream directions.

In some embodiments, the first unbalance index of the lane is determined based on a difference between a normalized upstream traffic speed and a normalized downstream traffic speed of the lane, the normalized upstream traffic speed of the lane is obtained by normalizing a traffic speed of the upstream section of the lane, and the normalized downstream traffic speed of the lane is obtained by normalizing a traffic speed of the downstream section of the lane.

In some embodiments, the second unbalance index of the traffic stream direction is determined based on a weighted sum of the first unbalance indexes of all lanes in the traffic stream direction, the weight of the weighted sum being a proportion that traffic volume of each lane accounts for in traffic volume of all lanes having the same direction.

In some embodiments, determining the traffic unbalance index of the road intersection based on the second unbalance indexes of the traffic stream directions comprises: determining the traffic unbalance index of the road intersection based on weighted sums of the second unbalance indexes of all traffic stream directions having a same phase in a traffic light cycle of the road intersection along with a sum of absolute values of the weighted sums; wherein the weight of the second unbalance index is a proportion that the traffic volume of each traffic stream direction accounts for in traffic volume of all traffic directions having the same phase.

In some embodiments, the road traffic information comprises at least one of: a travel speed of a vehicle traveling at the road intersection, time information corresponding to the travel speed, a name of the city to which the road intersection belongs, an identification code of the city, a name of an entrance road section, a name of an exit road section, a name of the road intersection, attributes of the road intersection, a road node identifier in an electronic map, a sheet number of the road node, a sheet number of the entrance road section, a road section identifier of the entrance road section, a sheet number of the exit road section, a road section identifier of the exit road section, a road direction of the entrance road section, a road direction of the exit road section, an entrance angle of the entrance road section, an exit angle of the exit road section, or a geographical area where the road intersection is located.

In some embodiments, the traffic parameter comprises at least one of: a traffic speed of the upstream road section of each lane in each traffic stream direction at the road intersection, a traffic speed of the downstream road section of each lane in each traffic stream direction at the road intersection, a first time period associated with each travel speed, a vehicle travel direction of the lane, one of a weekday or a weekend corresponding to the first time period, total traffic volume of the lane on all weekdays, or total traffic volume of the lane on all weekends, wherein the vehicle travel direction comprises turning left, turning right, going straight and turning around.

In some embodiments, a road traffic analysis platform includes a data acquisition interface for acquiring the road traffic information, a road traffic analysis interface for accessing and outputting the first adjustment length for each phase of the road intersection, and a data upload interface for uploading the road traffic information.

In some embodiments, the road traffic information is acquired from at least one of navigation data of the road intersection or road traffic data, the navigation data is acquired from a third-party map service provider through the data acquisition interface, and the road traffic data is received through the data upload interface and uploaded by a traffic data collection device provided at the road intersection.

In some embodiments, the road traffic analysis platform adjusts the phases at the road intersection based on the first adjustment length received from the road traffic analysis interface for each phase at the road intersection, and an interface protocol of traffic signal lights at the road intersection.

Embodiments of the present disclosure also provide a road traffic analysis apparatus. The apparatus can comprise a memory storing a set of instructions, and one or more processors configured to execute the set of instruction to cause the apparatus to perform: obtaining a traffic parameter of a road intersection by analyzing road traffic information of the road intersection; determining a reference adjustment length for each phase of a traffic signal cycle corresponding to each lane of the road intersection based on the road traffic information and the traffic parameter, wherein the traffic signal cycle has one or more phases; determining a first adjustment length when a difference between the reference adjustment length and the first adjustment length satisfies a condition associated with the lanes of the road intersection and the corresponding traffic parameter; and adjusting the phases of the traffic light cycle at the road intersection based on the first adjustment length for each phase.

Embodiments of the present disclosure also provide a non-transitory computer readable medium that stores a set of instructions that is executable by at least one processor of a computer to cause the computer to perform a road traffic analysis method. The method can comprise obtaining a traffic parameter of a road intersection by analyzing road traffic information of the road intersection; determining a reference adjustment length for each phase of a traffic signal cycle corresponding to each lane of the road intersection based on the road traffic information and the traffic parameter, wherein the traffic signal cycle has one or more phases; determining a first adjustment length when a difference between the reference adjustment length and the first adjustment length satisfies a condition associated with the lanes of the road intersection and the corresponding traffic parameter; and adjusting the phases of the traffic light cycle at the road intersection based on the first adjustment length for each phase.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings.

DETAILED DESCRIPTION

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

As stated above, improvements are needed to data collection of traffic information. Conventional solutions are limited in their capabilities to analyze the road traffic and estimate the changing trend of a traffic stream in each road section in the traffic network according to traffic information collected by traditional data collection devices. Accordingly, conventional solutions can have relatively low accuracy when correspondingly adjusting traffic signals of each road section in the traffic network according to analysis results of road traffic and estimation results of traffic stream trends. Thus, conventional solutions can have certain limitations on road traffic analysis of each road section in the traffic network.

Embodiments of the present disclosure provide a road traffic analysis method, a road traffic analysis apparatus, another road traffic analysis method and apparatus, and two electronic devices.

Figure 1:
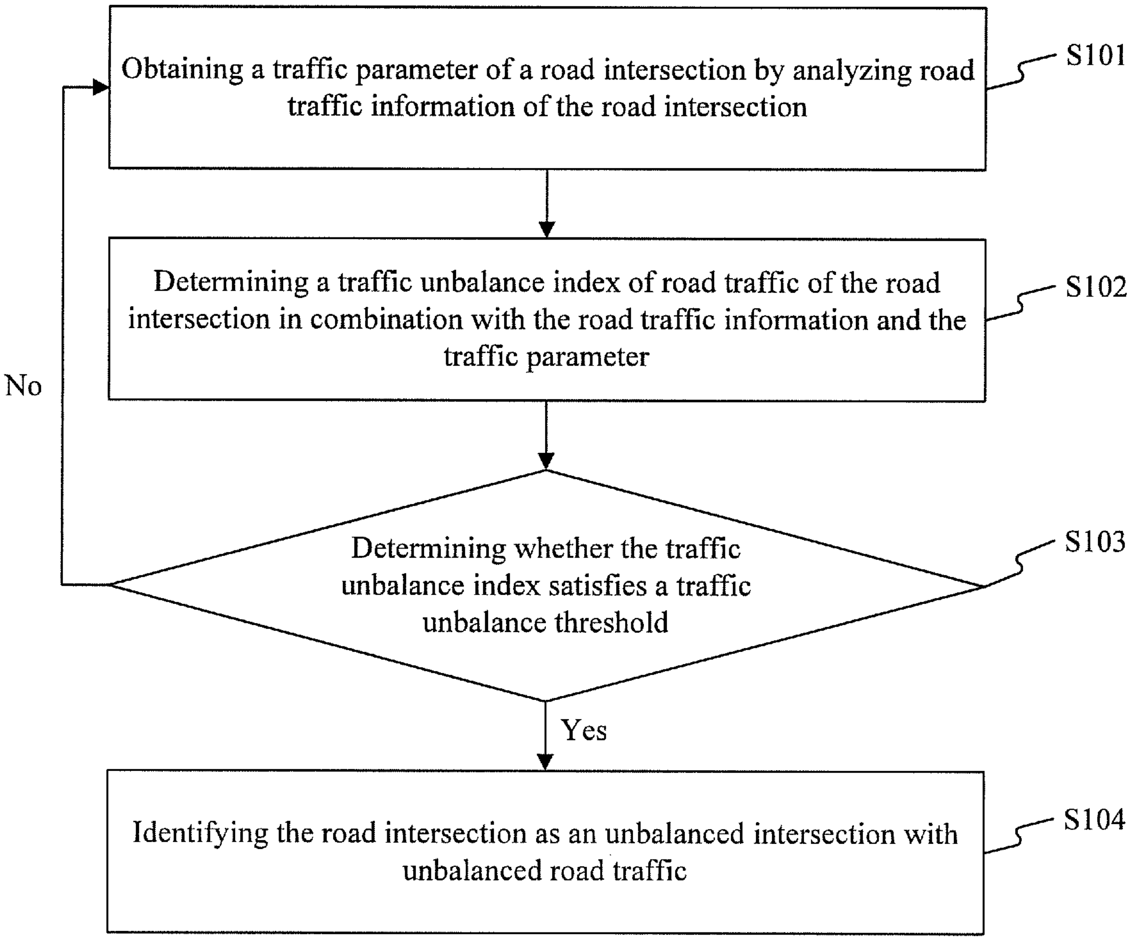
FIG. 1 is a flow chart of an exemplary road traffic analysis method, consistent with embodiments of the present disclosure.

FIG. 1 is a flow chart of an exemplary road traffic analysis method, consistent with embodiments of the present disclosure. The method can include the following steps.

In step S101, analysis is made according to acquired road traffic information of a road intersection to obtain a traffic parameter of the road intersection. An exemplary road intersection is shown in FIG. 2.

The exemplary road intersection can be a junction of two or more roads, such as a common crossroad, a T-junction, a three-way junction, and a roundabout. The road intersection is in a traffic network. The traffic network can be a geographical area containing at least one road intersection, or a road containing one or more road intersections. In some embodiments, analysis is made on road traffic of a road intersection in the traffic network, so as to determine the congestion degree of the road intersection in the traffic network, namely the road traffic unbalance situation of the road intersection in the traffic network. In addition, adjustment can be made to phase signals of the road intersection in the traffic network, so as to optimize the road traffic of the road intersection, improve passage efficiency of the road intersection, and reduce or eliminate the congestion of the road intersection in the traffic network.

Figure 2:
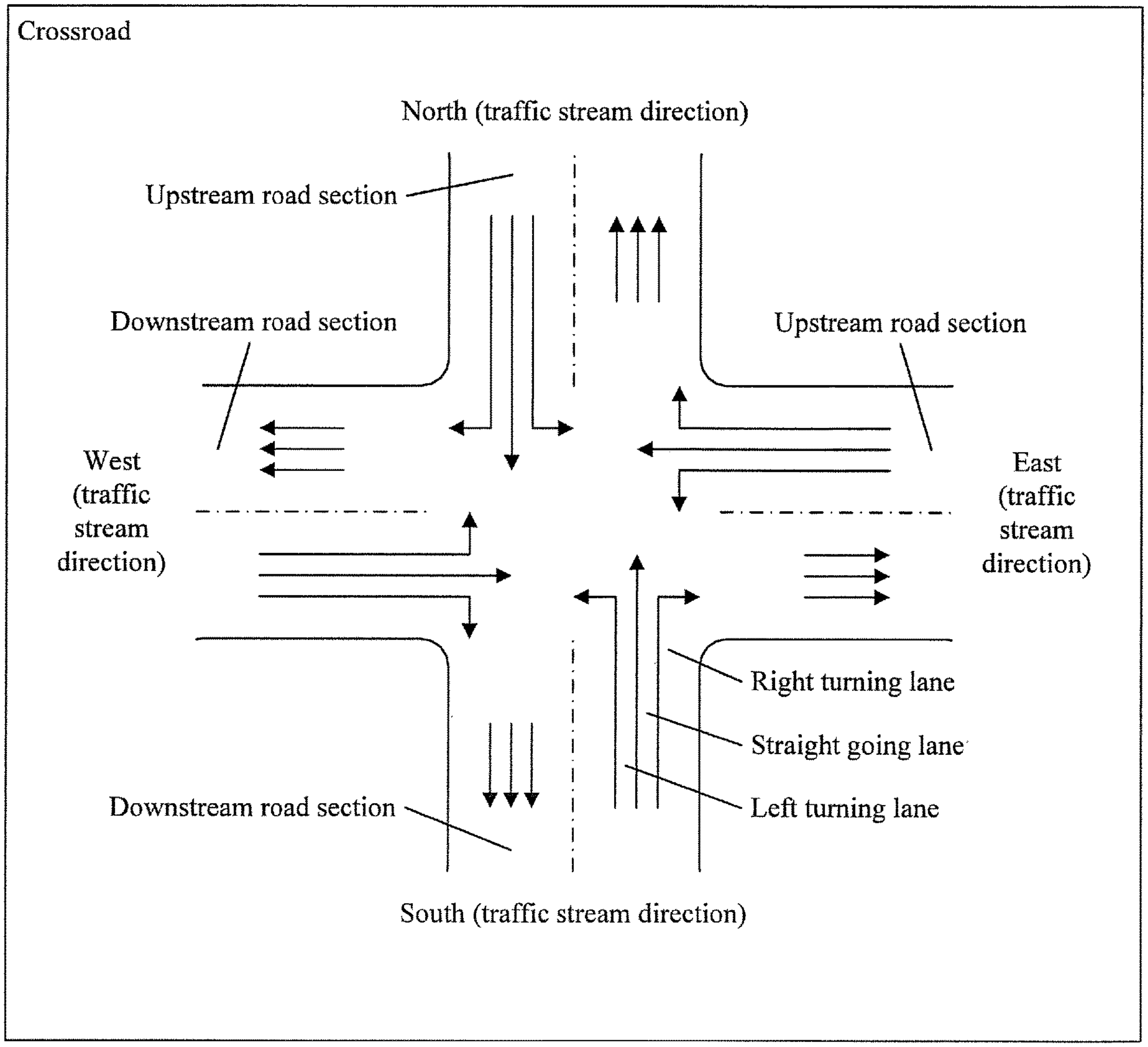
FIG. 2 is a schematic diagram of an exemplary road, consistent with embodiments of the present disclosure.

In an example of a crossroad as shown in FIG. 2, analysis is made on road traffic of the crossroad. The crossroad contains 4 traffic stream directions, i.e., east, south, west and north. An entrance direction of each traffic stream direction can be considered as an upstream road section of the current traffic stream direction, and an exit direction opposite to the upstream road section can be considered as the downstream road section of the current traffic stream direction. Further, each traffic stream direction has 3 lanes. Taking the traffic stream direction of “south” as an example, a middle lane is a straight going lane of driving from the upstream road section of the traffic stream direction of “south” to the downstream road section; a right lane is a right turning lane of driving from the upstream road section of the traffic stream direction of “south” to the downstream road section of the traffic stream direction of “east”; and a left lane is a left turning lane of driving from the upstream road section of the traffic stream direction of “south” to the downstream road section of the traffic stream direction of “west.” As such, there are 3 lanes in each traffic stream direction, and there are 12 lanes in total in the crossroad.

The road traffic information of the crossroad refers to original information of a vehicle driving on the entrance road section and the exit road section in each direction of the crossroad, and information related to the crossroad, for example, an actual travel speed of a vehicle traveling in the crossroad, time information corresponding to the actual travel speed, the name of the city to which the crossroad belongs, an identification code of the city, the name of an entrance road section, the name of an exit road section, the name of the crossroad, attributes of the crossroad (e.g., integrated intersection), a corresponding road node identifier in an electronic map, a sheet designation (e.g. sheet number) of the road node, a sheet designation of the entrance road section, a road section identifier of the entrance road section, a sheet designation of the exit road section, a road section identifier of the exit road section, a road direction of the entrance road section, a road direction of the exit road section, an entrance angle of the entrance road section, an exit angle of the exit road section, and the geographical area where the road intersection is located.

Many travelers have terminal devices transmitting geographical position information, a movement speed and a moving speed to a cloud through mobile Internet in real time. In addition, many travelers also obtain navigation information by accessing an online map platform. The navigation information contains geographical position information and a travel route. The geographical position information, the movement speed, the direction and the travel route can all serve as road traffic information on a corresponding road section. Due to the widespread use of mobile terminal devices, intense coverage on time and space makes it possible to collect the road traffic information with less impact by blind spots.

The traffic parameter contains road traffic of the crossroad and information related to the crossroad, and the traffic parameter comprises one or more of the following parameters: an actual travel speed of the upstream road section of each lane of the crossroad in each traffic stream direction, an actual travel speed of the downstream road section of each lane of the road intersection in each traffic stream direction, the travel speed in a short time granularity (e.g. a short time period), a travel direction of the lane, a weekday/weekend in the short time granularity, total traffic volume of the lane on all weekdays, and total traffic volume of the lane on all weekends. The travel direction comprises turning left, turning right, going straight and turning around.

A corresponding data structure can be configured for the road traffic information. The configured data structure contains various parameters of the road traffic information. Similarly, a corresponding data structure can also be configured for the traffic parameter, and the configured data structure contains various parameters of the traffic parameter.

In some embodiments, the traffic parameter for characterizing road traffic of the crossroad is obtained by analyzing the acquired road traffic information of the crossroad. Now referring to the crossroad shown in FIG. 2, in the straight going lane of the "south" direction, the actual travel speed of the upstream road section is lower than that of the downstream road section. It may be because the traffic flow in the upstream road section of the straight going lane is too large, leading to congested traffic. Some calculation and verification can be performed in the following steps to determine if the crossroad is an unbalanced intersection with unbalanced traffic.

However, the road traffic information and the traffic parameter often indicate the road traffic of the crossroad at a moment or in a short period of time. It is appreciated that a data fusion operation can also be used to address this issue. The road traffic information and the traffic parameter are fused, through the data fusion operation, to be road traffic information and a traffic parameter that can reflect traffic rules. For example, before the fusion, the road traffic information and the traffic parameter indicate road traffic of the crossroad within 2 min, while after the fusion, the road traffic information and the traffic parameter indicate road traffic of the crossroad within 10 min or 30 min. The data fusion operation can include: fusing the road traffic information and the traffic parameter using a data fusion algorithm. The road traffic information and the traffic parameter are road traffic information and a traffic parameter in a short time granularity (e.g., a first time period) before the fusion, and are road traffic information and a traffic parameter in a long time granularity (e.g., a second time period being longer than the first time period) after the fusion, and accordingly, the road traffic information and the traffic parameter involved in the following step are road traffic information and a traffic parameter in a long time granularity after the fusion.

In an example that the data fusion algorithm is used to fuse the traffic information and the traffic parameter. A travel speed contained in the traffic parameter in a long time period equals an average of each travel speed in short time periods covered by the long time period. In addition, weights on the short time periods can be used to calculate the travel speed in the long time period. The traffic parameter can contain a traffic volume. The traffic volume in the long time granularity equals a sum of each traffic volume in short time periods covered by the long time period.

Similarly, the other parameters contained in the road traffic information and the traffic parameter can also be fused using the data fusion algorithm. When different parameters are fused using the data fusion algorithm, fusion calculation is performed using a corresponding algorithm contained in the data fusion algorithm.

In some embodiments, after a traffic parameter of the crossroad is obtained by analyzing according to acquired road traffic information of the crossroad, data optimization operation can also be executed. Any influence that the actual road network structure of the crossroad can have on the road traffic information and the traffic parameter is eliminated by the data optimization operation. For example, in a practical geographical environment, the traffic stream direction of "south" of a crossroad can have 4 lanes: 1 lane for turning left, 2 lanes for going straight, and 1 lane for turning right, while the traffic stream direction of "north" of the crossroad can have 3 lanes: 1 lane for turning left, 1 lane for going straight, and 1 lane for turning right. Traffic flows in the 2 lanes for going straight in the traffic stream direction of "south" will swarm into the lane for going straight in the traffic stream direction of "north", which can cause an excessively large traffic flow in the lane for going straight in the traffic stream direction of "north". However, the above-mentioned situation is considered normal. In order to reduce the influence caused by actual geographical environment limitations to the following road traffic analysis process, the traffic flow in the lane for going straight in the traffic stream direction of "north" can be optimized to remain within a reasonable numerical range using an optimization coefficient through a data optimization operation.

In some embodiments, the data optimization operation can also be executed for the road traffic information of the crossroad, so as to optimize one or more parameters contained in the road traffic information through the data optimization operation. In addition, the data optimization operation can also be executed for both of the road traffic information and the traffic parameter, so as to optimize one or more parameters contained in the road traffic information and the traffic parameter.

Now referring back to FIG. 1, in step S102, a traffic unbalance index of road traffic of the road intersection is determined in combination with the road traffic information and the traffic parameter.

In step S101 mentioned above, the traffic parameter for characterizing road traffic of the crossroad is obtained by analyzing the road traffic information of the crossroad. In step S102, the traffic unbalance index of the road traffic of the crossroad is determined based on the road traffic information and the traffic parameter of the crossroad. Step S102 can include the following steps.

In step 1, first unbalance indexes of the lanes are determined based on the road traffic information and the traffic parameter.

In some embodiments, in the exemplary crossroad shown in FIG. 2, first unbalance indexes of 12 lanes of the crossroad in 4 traffic stream directions are calculated respectively. The first unbalance index of any lane of the crossroad equals a difference between an upstream travel speed and a downstream travel speed of the lane. The upstream travel speed of the lane is obtained by normalizing an actual travel speed of the upstream road section of the lane, and the downstream travel speed of the lane is obtained by normalizing an actual travel speed of the downstream road section of the lane.

In some embodiments, the actual travel speed of the upstream road section of the lane can be normalized in the following way: dividing the actual travel speed of the upstream road section of the lane by a free speed (e.g., a non-congested or usual travel speed of a vehicle passing the lane or an allowed maximum travel speed for passing the lane, the free speed being a reference speed) of the lane, to obtain the upstream travel speed of the lane. Similarly, the actual travel speed of the downstream road section of the lane can be normalized in the following way: dividing the actual travel speed of the downstream road section of the lane by a free speed of the lane, to obtain the downstream travel speed of the lane.

In step 2, second unbalance indexes of the traffic stream directions are determined based on the first unbalance indexes of the lanes.

In some embodiments, second unbalance indexes of 4 traffic stream directions of the crossroad are respectively calculated. The second unbalance index of any traffic stream direction of the crossroad equals a weighted sum of the first unbalance indexes of all the lanes in the traffic stream direction. The weight of the first unbalance index can be a ratio of the traffic flow of each lane to the total traffic flow of the traffic stream direction which contains all lanes. For example, if the traffic flow of each of the 3 lanes in the traffic stream direction of "south" of the crossroad accounts for ⅓ of the total traffic flow in the traffic stream direction of "south," the weight of the first unbalance indexes of each of the 3 lanes is ⅓.

3) A traffic unbalance index of the crossroad is determined according to the second unbalance indexes of the traffic stream directions.

In some embodiments, a traffic unbalance index of the crossroad is obtained by calculating weighted sums of the second unbalance indexes of all traffic stream directions having the same phase signal in a phase cycle (a single signal cycle contains at least two phase signals), of the crossroad, and summing absolute values of the obtained weighted sums. The weight of the second unbalance index is a proportion that traffic flow of each traffic stream direction accounts for in total traffic flow of all traffic stream directions having the same phase signal.

For example, at a crossroad in a phase cycle, phase signals of a traffic stream direction of "south" and a traffic stream direction of "north" are the same, and phase signals of a traffic stream direction of "east" and a traffic stream direction of "west" are the same. In an example that a traffic flow of the traffic stream direction of "south" is ⅓ of sum of traffic volume of "south" and "north", then the weight of a second unbalance index of the traffic stream direction of "south" is ⅓, and therefore traffic flow of the traffic stream direction of "north" is ⅔ of the sum of traffic volume of "south" and "north", then the weight of a second unbalance index of the traffic stream direction of "north" is ⅔. A weighted sum of the second unbalance indexes of the traffic stream direction of "south" and the traffic stream direction of "north" can be calculated. Similarly, a weighted sum of the second unbalance indexes of the traffic stream direction of "east" and the traffic stream direction of "west" is calculated. The traffic unbalance index of the crossroad is calculated as a numerical value obtained by summing the absolute values of the two weighted sums obtained by the calculation above.

In an example of a three-way junction, phase signals of all traffic stream directions of the three-way junction in one phase cycle are different from one another. A traffic unbalance index of the three-way junction can be determined by calculating the sum of absolute values of second unbalance indexes of all traffic stream directions having opposite phase signals in a phase cycle. In addition, a traffic unbalance index of the three-way junction can be determined by calculating a weighted sum of second unbalance indexes of all traffic stream directions having opposite phase signals in a phase cycle. The weight of the second unbalance index is a proportion that traffic flow of each traffic stream direction accounts for in total traffic flow of the crossroad.

Now referring back to FIG. 1, in step S103, whether the traffic unbalance index exceeds a traffic unbalance threshold is determined.

In step S102, the traffic unbalance index of the road traffic of the crossroad is determined based on the road traffic information and the traffic parameter of the crossroad. In step S103, whether the road traffic of the crossroad is in an unbalanced state is determined by determining whether the traffic unbalance index exceeds a traffic unbalance threshold based on the traffic unbalance index of the road traffic of the crossroad obtained in step S102. If the traffic unbalance index exceeds the traffic unbalance threshold, the method proceeds to step S104 for identifying the crossroad as an unbalanced intersection with unbalanced road traffic in the traffic network. If the traffic unbalance index does not exceed the traffic unbalance threshold, for an intersection which has not been set in the traffic network, the method returns to step S101 for recognizing road traffic of the crossroad which has not been identified in the traffic network.

In Step S104, the road intersection is identified as an unbalanced intersection with unbalanced road traffic.

The method proceeds to step S104 if in step S103 the traffic unbalance index of the crossroad exceeds the traffic unbalance threshold. The crossroad of which the traffic unbalance index exceeds the traffic unbalance threshold at present is identified as an unbalanced intersection having unbalanced road traffic in the traffic network. With steps S101 to S104 being performed in the method, all the intersections having road traffic in an unbalanced state in the traffic road network can be identified.

In some embodiments, after the crossroad having road traffic in an unbalanced state in the traffic network has been identified by performing step S101 to step S104, the road traffic of the crossroad can also be optimized. In particular, the road traffic can be optimized by controlling traffic signal lights at the crossroad, thereby improving the efficiency of the crossroad, so that the road traffic of the crossroad can be restored to be normal. The optimization can include the following steps.

In step 1, a theoretical phase adjustment time for each phase signal of each lane of the road intersection in each traffic stream direction is determined according to the road traffic information or the traffic parameter.

In some embodiments, the theoretical phase adjustment time for each phase signal of 12 passage lines of the crossroad in 4 traffic stream directions are respectively calculated. The theoretical phase adjustment time of any lane of the crossroad equals a product of a difference between an actual travel speed of the upstream road section and an actual travel speed of the downstream road section of the lane, times a preset phase adjustment coefficient. For example, the theoretical phase adjustment time for each phase signal of any lane of the crossroad is calculated by the following formula:

$$\Delta_i^t = f(d_i^t, t, i);$$

$$d_i^t = v_{a_i}^t - v_{d_i}^t;$$

$$f(x, t, i) = \beta_i^t * x;$$

$$\Delta_i^t = f(d_i^t, t, i) = \beta_i^t * d_i^t = \beta_i^t * (v_{a_i}^t - v_{d_i}^t),$$

where i is a current lane, t is a preset time interval (10 min or 30 min), $\Delta_i^t$ is the theoretical phase adjustment time of the current lane within 10 min. $d_i^t$ is the unbalance degree of the theoretical phase adjustment time of the current lane within 10 min, $v_{a_i}^t$ and $v_{d_i}^t$ are actual travel speeds of the upstream road section and the downstream road section of the current lane within 10 min, and $\beta_i^t$ is a phase adjustment coefficient.

The optimization can further include the following step. In step 2, an actual phase adjustment time for each phase signal of the road intersection is determined when a difference between the theoretical phase adjustment time and the actual phase adjustment time is at a minimum.

In some embodiments, the actual phase adjustment time can be calculated based on a preset phase adjustment model. An objective function used in the phase adjustment model is:

$$\min\sum_{i=1}^{n}\left(w_i^t\left(\Delta_i^t-\sum_{j\in s_i}\delta_j^t\right)\right)^2$$

where n is the number of lanes of the crossroad in traffic stream directions, t is a preset time interval (such as 10 min or 30 min is the ratio of the traffic flow of the current lane within 10 min to the total traffic flow of the traffic stream direction containing all lanes, $\Delta_i^t$ is a theoretical phase adjustment time of the current lane within the preset time interval, $\delta_j^t$ is an actual phase adjustment time for each phase signal within 10 min, a single signal cycle contains at least two phase signals, and $s_i$ is a phase signal set for allocating a phase signal to the current lane.

Moreover, the objective function can satisfy the following condition: the sum of actual phase adjustment times of all phase signals of the lane in a single phase cycle equals 0, namely:

$$\Sigma_{j=1}^{m}\delta_j^t=0;$$

where m is the number of phase signals in a complete phase cycle (stages of a phase signal).

It is appreciated that, in some embodiments, a functional relationship between an actual phase adjustment time and an unbalance degree can be learnt by means of artificial intelligence and a bigdata cloud computation platform. The phase adjustment model can be trained using a phase adjustment coefficient in the objective function, so as to obtain a more precise phase adjustment coefficient, such as a phase adjustment coefficient for different time sections (a peak time section and a off-peak time section), a phase adjustment coefficient for different time periods (a weekday and a weekend), and a phase adjustment coefficient for different intersections in the traffic network. Therefore, the actual phase adjustment time obtained using the objective function of the corresponding phase adjustment coefficient is more precise.

The optimization can further include the following step. In step 3, phase signals of the crossroad are adjusted according to the actual phase adjustment time for each phase signal of the crossroad.

The actual phase adjustment time is obtained in step 2. The duration of each phase signal of the crossroad in the phase cycle is adjusted to an optimal duration while the phase cycle of the traffic signal lights of the crossroad remains unchanged. The adjusting of the phase cycle to the optimal duration enables the optimal intersection efficiency, so that the intersection traffic reaches a balance.

For example, with respect to the crossroad shown in FIG. 2, the actual travel speed of the upstream road section of the straight going lane in the traffic stream direction of "south" is significantly lower than the actual travel speed of the downstream road section, which can be caused by large volume of the traffic in the straight-going lane of the upstream section. It can cause cars waiting in line and slow-down of the traffic. In this situation, phase information corresponding to the straight going lane in the traffic stream direction of "south" can be adjusted, for example, increasing the proportion of green light length in a cycle in the direction of driving from south to north to relieve traffic congestion. Similarly, if the actual travel speed of the downstream road section is significantly lower than the actual travel speed of the upstream road section in the straight going lane caused by congestion in the downstream road section of the straight going lane, the entering traffic volume in the upstream road section can be reduced by, for example, reducing the proportion of green light length in the cycle in the direction of driving from south to north.

In practical implementation, the road traffic analysis method provided in the embodiments of the present disclosure can also be implemented based on a pre-established road traffic analysis platform, for example, a bigdata analysis and computation platform provided by Aliyun, where the bigdata analysis and computation platform provides, to the public, a data upload interface for uploading the road traffic information and a road traffic analysis interface for accessing an actual phase adjustment time for each phase signal of the road intersection. For example, when a local traffic management department uses the bigdata analysis and computation platform provided by Aliyun to analyze road traffic of a road intersection in a traffic network in an administrative area, road traffic information of the road intersection in the traffic network can be uploaded through the data upload interface, and an actual phase adjustment time, obtained by analysis, for each phase signal of the road intersection in the traffic network can be accessed from the bigdata analysis and computation platform through the road traffic analysis interface. In addition, the bigdata analysis and computation platform can also be configured with a data acquisition interface for actively acquiring the road traffic information.

Based on the bigdata analysis and computation platform provided by Aliyun, road traffic of a road intersection in the traffic network can be analyzed more precisely in combination with bigdata. In particular, there are the following two approaches to acquire the "bigdata" (e.g., the road traffic data). The first approach is to acquire navigation data of each road intersection in the traffic network from a third-party map service provider through the data acquisition interface. The navigation data contains the road traffic information, for example, navigation data of each road intersection in the traffic network in a specific time period in the past is acquired from a map (e.g., Amap), and data information such as geographical position information, a movement speed, a direction and a travel route contained in these large amounts of navigation data is used as a data basis for analyzing road traffic of each road intersection in the traffic network. The second approach is to receive, through the data upload interface, collected road traffic data uploaded by a traffic data collection device arranged at each road intersection in the traffic network. The collected road traffic data contains the road traffic information, for example, collected road traffic data collected by traditional traffic data collection devices such as a video collection device, a coil and a microwave detection device is received through the data upload interface, and the collected road traffic data is used as a data basis for analyzing road traffic of each road intersection in the traffic network.

In addition, on the basis of the above-described analyzing road traffic of each road intersection in the traffic network based on the bigdata analysis and computation platform provided by Aliyun, an actual phase adjustment time for each phase signal of each road intersection in the traffic network, which is obtained by the bigdata analysis and computation platform by analysis, can be converted into data streams matching a current interface protocol in combination with an interface protocol corresponding to traffic signal lights arranged at each road intersection in the traffic network. The data streams can be output to the traffic signal lights arranged at each road intersection in the traffic network. The actual phase adjustment time for each phase signal of each road intersection in the traffic network is utilized to correspondingly adjust the phase signal of the corresponding road intersection, so that the analysis of road traffic of each road intersection in the traffic network is more intelligent.

In summary, in the road traffic analysis method provided by embodiments of the present disclosure, when analyzing road traffic of a crossroad in the traffic network, road traffic information, collected in advance, of the road intersection is firstly analyzed to obtain a traffic parameter indicating road traffic of the crossroad. A traffic unbalance index indicating a road traffic unbalance level of the crossroad is further calculated in combination with the traffic parameter. Lastly the road traffic unbalance situation of the crossroad is analyzed according to the traffic unbalance index, so as to identify an unbalanced intersection, in the traffic network. In the road traffic analysis method, a traffic unbalance index analysis system for the crossroad is designed in combination with road traffic information and a traffic parameter of the crossroad, and a road traffic unbalance situation of the crossroad is analyzed through the traffic unbalance index analysis system, so that the analysis of road traffic of the crossroad is more detailed, and unbalanced intersection identification is more accurate.

In some embodiments, a road traffic analysis method is provided. The embodiments can further provide a road traffic analysis apparatus, which will be described below in conjunction with the accompanying drawings.

Figure 3:
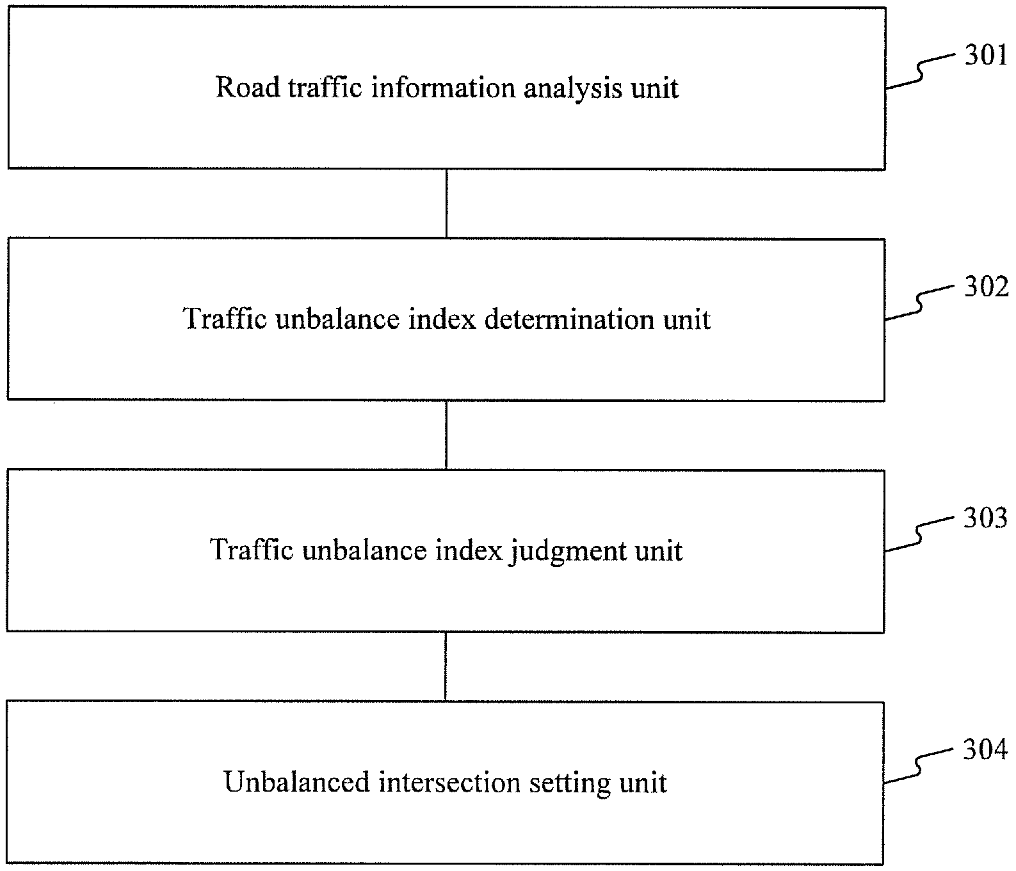
FIG. 3 is a schematic diagram of an exemplary road traffic analysis apparatus, consistent with embodiments of the present disclosure.

Reference is given to FIG. 3 which illustrates a schematic diagram of an exemplary road traffic analysis apparatus, consistent with embodiments of the present disclosure.

The road traffic analysis apparatus can comprise a road traffic information analysis unit 301, a traffic unbalance index determination unit 302, a traffic unbalance index judgment unit 303 and an unbalanced intersection setting unit 304.

Road traffic information analysis unit 301 is configured to analyze according to acquired road traffic information of a road intersection to obtain a traffic parameter of the road intersection.

Traffic unbalance index determination unit 302 is configured to determine a traffic unbalance index of road traffic of the road intersection based on the road traffic information and the traffic parameter.

Traffic unbalance index judgment unit 303 is configured to determine whether the traffic unbalance index exceeds a preset traffic unbalance threshold. If the traffic unbalance index exceeds the preset traffic unbalance threshold, the procedure proceeds to unbalanced intersection setting unit 304.

Unbalanced intersection setting unit 304 is configured to identify the road intersection as an unbalanced intersection with unbalanced road traffic.

In some embodiments, the road traffic analysis apparatus can also comprise a data fusion unit. The data fusion unit can be configured to fuse the road traffic information and the traffic parameter using a data fusion algorithm. Before being fused, the road traffic information and the traffic parameter are in a short time granularity (e.g., the road traffic information and the traffic parameter being associated with a shorter period), and after being fused, road traffic information and a traffic parameter are in a long time granularity (e.g., the road traffic information and the traffic parameter being associated with a longer period).

Accordingly, the road traffic information and the traffic parameter in traffic unbalance index determination unit 302 are road traffic information and a traffic parameter in a long time granularity after the fusion.

In some embodiments, the road traffic analysis apparatus can comprise a data optimization unit. The data optimization unit is configured to optimize the road traffic information or the traffic parameter according to a parameter contained in the road traffic information or the traffic parameter and related to a road network structure of the road intersection.

In some embodiments, traffic unbalance index calculation unit 302 can comprise a first unbalance index determination sub-unit, a second unbalance index determination sub-unit, and a traffic unbalance index determination sub-unit. The first unbalance index determination sub-unit is configured to determine first unbalance indexes of the lanes according to the road traffic information and the traffic parameter.

The second unbalance index determination sub-unit is configured to determine second unbalance indexes of the traffic stream directions according to the first unbalance indexes of the lanes.

The traffic unbalance index determination sub-unit is configured to determine a traffic unbalance index of the road intersection according to the second unbalance indexes of the traffic stream directions.

In some embodiments, the first unbalance index of the lane is determined according to a difference between an upstream travel speed and a downstream travel speed of the lane. The upstream travel speed of the lane is obtained by normalizing an actual travel speed of the upstream road section of the lane, and the downstream travel speed of the lane is obtained by normalizing an actual travel speed of the downstream road section of the lane.

In some embodiments, the actual travel speed of the upstream road section of the lane is normalized in the following way: dividing the actual travel speed of the upstream road section of the lane by a preset free speed (e.g., a reference speed) of the lane, to obtain the upstream travel speed of the lane.

In some embodiments, the actual travel speed of the downstream road section of the lane is normalized in the following way: dividing the actual travel speed of the downstream road section of the lane by a preset free speed of the lane, to obtain the downstream travel speed of the lane.

In some embodiments, the second unbalance index of the traffic stream direction is determined according to a weighted sum of the first unbalance indexes of all lanes in the traffic stream direction, the weight being a proportion that the traffic flow of each lane accounts for in the total traffic flow of the traffic stream direction to which the lane belongs.

In some embodiments, the traffic unbalance index determination sub-unit can comprise a first sub-unit. The first sub-unit is configured to determine a traffic unbalance index of the road intersection according to weighted sums of the second unbalance indexes of all traffic stream directions, having the same phase signal in a phase cycle, of the road intersection in combination with the sum of absolute values of the obtained weighted sums, wherein the weight of the second unbalance index is a proportion that the traffic flow of the corresponding traffic stream direction accounts for in the total traffic flow of all traffic stream directions having the same phase signal.

In some embodiments, the traffic unbalance index determination sub-unit can further comprise a second sub-unit. The second sub-unit is configured to determine a traffic unbalance index of the road intersection according to the sum of absolute values of second unbalance indexes of all traffic stream directions, having opposite phase signals in a phase cycle, of the road intersection.

The traffic unbalance index determination sub-unit can comprise a third sub-unit. The third sub-unit is configured to determine a traffic unbalance index of the road intersection according to a weighted sum of second unbalance indexes of all traffic stream directions, having opposite phase signals in a phase cycle, of the road intersection. The weight of the second unbalance index is a proportion that the traffic flow of the corresponding traffic stream direction accounts for in the total traffic flow of the road intersection.

In some embodiments, the road traffic information comprises at least one of the following: an actual travel speed of a vehicle traveling in the road intersection, time information corresponding to the actual travel speed, a name of the city to which the road intersection belongs, an identification code of the city, a name of an entrance road section, a name of an exit road section, a name of the road intersection, attributes of the road intersection, a corresponding road node identifier in an electronic map, a sheet designation of the road node, a sheet designation of the entrance road section, a road section identifier of the entrance road section, a sheet designation of the exit road section, a road section identifier of the exit road section, a road direction of the entrance road section, a road direction of the exit road section, an entrance angle of the entrance road section, an exit angle of the exit road section, and a geographical area where the road intersection is located.

In some embodiments, the traffic parameter comprises at least one of the following: an actual travel speed of the upstream road section of each lane of the road intersection in each traffic stream direction, an actual travel speed of the downstream road section of each lane of the road intersection in each traffic stream direction, a short time granularity to with which the actual travel speeds are associated, a vehicle travel direction corresponding to the lane, a weekday/weekend corresponding to the short time granularity, total traffic flow of the lane on all weekdays, and total traffic flow of the lane on all weekends. The vehicle travel direction comprises turning left, turning right, going straight and turning around.

In some embodiments, the road intersection is in a traffic network, the traffic network contains at least one road intersection, and accordingly, if it is determined by traffic unbalance index judgment unit 303 that the traffic unbalance index does not exceed the traffic unbalance threshold, road traffic information analysis unit 301 is executed for a road intersection in the traffic network which has not been identified as unbalanced or not.

In some embodiments, the road traffic analysis apparatus can comprise a theoretical phase adjustment time determination unit, an actual phase adjustment time determination unit, and a phase signal adjustment unit.

The theoretical phase adjustment time determination unit is configured to determine, according to one of the road traffic information or the traffic parameter, a theoretical phase adjustment time for each phase signal of each lane of the road intersection in each traffic stream direction.

The actual phase adjustment time determination unit is configured to determine, according to the theoretical phase adjustment times of each lane of the road intersection in each traffic stream direction, an actual phase adjustment time for each phase signal of the road intersection when a difference between the theoretical phase adjustment time and the actual phase adjustment time is at a minimum.

The phase signal adjustment unit is configured to adjust, according to the actual phase adjustment time for each phase signal of the road intersection, phase signals of the road intersection.

In some embodiments, the theoretical phase adjustment time for each phase signal of the lane is determined according to a product of the difference between an actual travel speed of the upstream road section and an actual travel speed of the downstream road section of the lane times a phase adjustment coefficient.

In some embodiments, one of determining the theoretical phase adjustment time or determining the actual phase adjustment time can be performed based on a phase adjustment model. In additional, the phase adjustment coefficient can be obtained through learning and training with the phase adjustment model.

In some embodiments, the sum of actual phase adjustment times for all phase signals of the lane in a single phase cycle equals 0.

In some embodiments, the road traffic analysis apparatus can operate based on a pre-established road traffic analysis platform. The road traffic analysis platform is provided with a data acquisition interface for acquiring the road traffic information, a road traffic analysis interface for accessing and outputting the actual phase adjustment time for each phase signal of the road intersection, and optionally a data upload interface for uploading the road traffic information.

In some embodiments, the road traffic information is acquired in at least one of the following ways.

Navigation data of the road intersection can be acquired from a third-party map service provider through the data acquisition interface. The navigation data contains the road traffic information.

Collected road traffic data uploaded by a traffic data collection device provided at the road intersection can be received through the data upload interface. The collected road traffic data contains the road traffic information.

In some embodiments, the road traffic analysis platform adjusts phase signals of the road intersection according to the actual phase adjustment time which is output by the road traffic analysis interface for each phase signal of the road intersection along with an interface protocol corresponding to traffic signal lights provided at the road intersection.

Consistent with embodiments of the present disclosure, another exemplary road traffic analysis method can be provided and will be described below in conjunction with the accompanying drawings.

Figure 4:
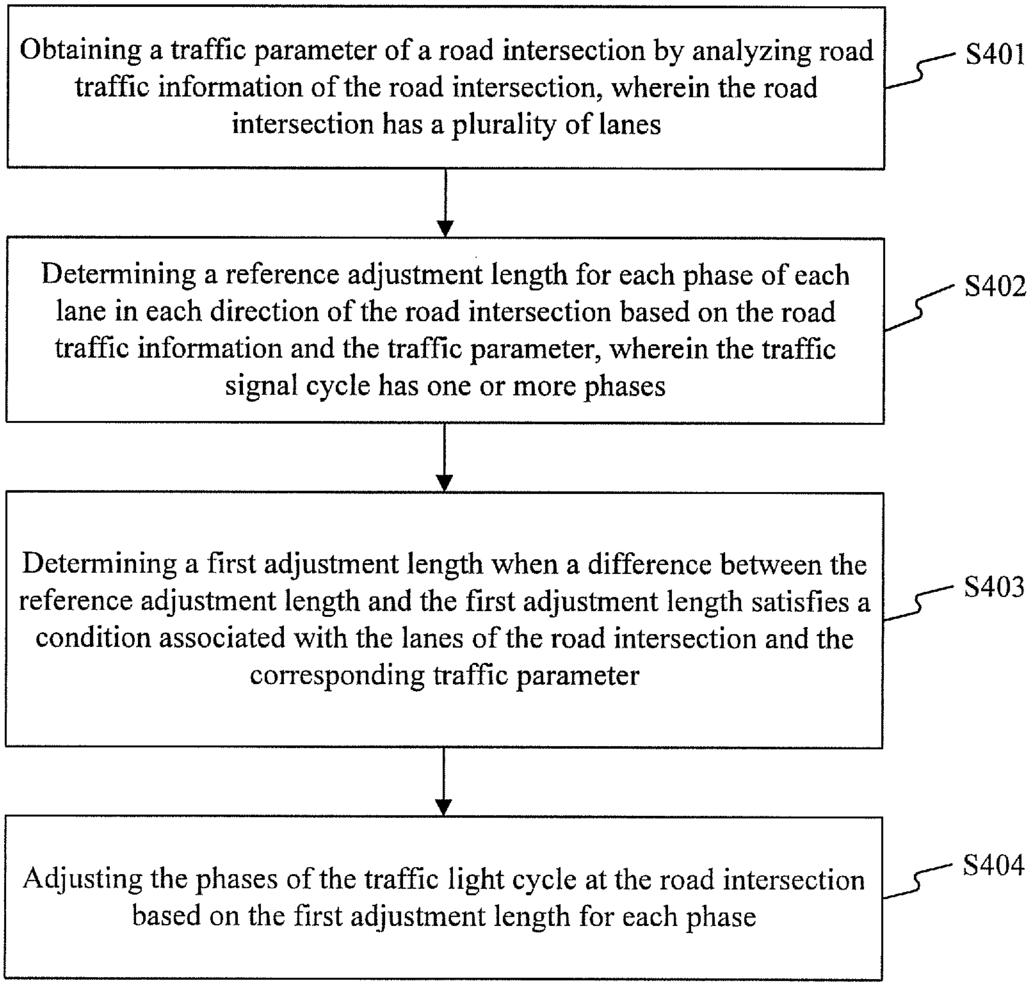
FIG. 4 is a flow chart of an exemplary road traffic analysis method, consistent with embodiments of the present disclosure.

Reference is given to FIG. 4 which illustrates a flow chart of another exemplary road traffic analysis method, consistent with embodiments of the present disclosure.

In the exemplary road traffic analysis method illustrated in FIG. 1, unbalance is identified for a road intersection in a traffic network. If the road intersection in the traffic network is identified as an unbalanced intersection with unbalanced road traffic, road traffic of the unbalanced intersection is optimized. Specifically, the optimization of the road traffic of the unbalanced intersection are realized by adjusting a phase signal of the unbalanced intersection, thereby improving the intersection efficiency, so that the road traffic of the unbalanced intersection can be restored to be normal. In contrast, in the exemplary road traffic analysis method illustrated in FIG. 4, the phase signal of the road intersection in the traffic network is adjusted, and a particular process of adjusting the phase signal of the road intersection is similar to the process of adjusting the phase signal of the unbalanced intersection in the embodiments illustrated in FIG. 1.

Embodiments of the present disclosure can provide another exemplary road traffic analysis method. The method can include the following steps.

In step S401, a traffic parameter of the road intersection is obtained by analyzing road traffic information of a road intersection.

In step S402, a theoretical phase adjustment time for each phase signal of each lane of the road intersection in each traffic stream direction is determined based on the road traffic information and the traffic parameter.

In step S403, determining, based on the theoretical phase adjustment times of each lane of the road intersection in each traffic stream direction, an actual phase adjustment time for each phase signal of the road intersection when a difference between the theoretical phase adjustment time and the actual phase adjustment time is at a minimum.

In step S404, adjusting phase signals of the road intersection are adjusted based on the actual phase adjustment time for each phase signal of the road intersection.

In some embodiments, the theoretical phase adjustment time for each phase signal of the lane is determined according to a product of the difference between an actual travel speed of the upstream road section and an actual travel speed of the downstream road section of the lane, times a phase adjustment coefficient.

In some embodiments, at least one of step S401, step S402, or step S403 can be implemented based on a preset phase adjustment model. In addition, the phase adjustment coefficient is obtained through learning and training using the phase adjustment model.

In some embodiments, the sum of actual phase adjustment times for all phase signals of the lane in a single phase cycle equals 0.

In some embodiments, the road traffic information comprises at least one of the following: an actual travel speed of a vehicle traveling at the road intersection, time information corresponding to the actual travel speed, a name of the city to which the road intersection belongs, an identification code of the city, a name of an entrance road section, a name of an exit road section, a name of the road intersection, attributes of the road intersection, a corresponding road node identifier in an electronic map, a sheet number of the road node, a sheet number of the entrance road section, a road section identifier of the entrance road section, a sheet designation of the exit road section, a road section identifier of the exit road section, a road direction of the entrance road section, a road direction of the exit road section, an entrance angle of the entrance road section, an exit angle of the exit road section, and a geographical area where the road intersection is located.

In some embodiments, the traffic parameter comprises at least one of the following: an actual travel speed of the upstream road section of each lane of the road intersection in each traffic stream direction, an actual travel speed of the downstream road section of each lane of the road intersection in each traffic stream direction, a short time granularity to which the actual travel speeds are subordinated, a vehicle travel direction corresponding to the lane, a weekday/weekend corresponding to short time granularity (e.g. a short time period), total traffic flow of the lane on all weekdays, and total traffic flow of the lane on all weekends. The vehicle travel direction comprises turning left, turning right, going straight and turning around.

In some embodiments, the road traffic analysis method is implemented based on a pre-established road traffic analysis platform. The road traffic analysis platform is provided with a data acquisition interface for acquiring the road traffic information, a road traffic analysis interface for accessing and outputting the actual phase adjustment time for each phase signal of the road intersection, and/or a data upload interface for uploading the road traffic information.

In some embodiments, the road traffic information is acquired in at least one of the following ways. Navigation data of the road intersection can be acquired from a third-party map service provider through the data acquisition interface. The navigation data contains the road traffic information.

Collected road traffic data uploaded by a traffic data collection device provided at the road intersection, can be received through the data upload interface. The collected road traffic data contains the road traffic information.

In some embodiments, the road traffic analysis platform adjusts phase signals of the road intersection based on the actual phase adjustment time received from the road traffic analysis interface for each phase signal of the road intersection, and an interface protocol of traffic signal lights at the road intersection.

Embodiments of the present disclosure further provides another exemplary road traffic analysis apparatus, which is described below in conjunction with the accompanying drawings.

Figure 5:
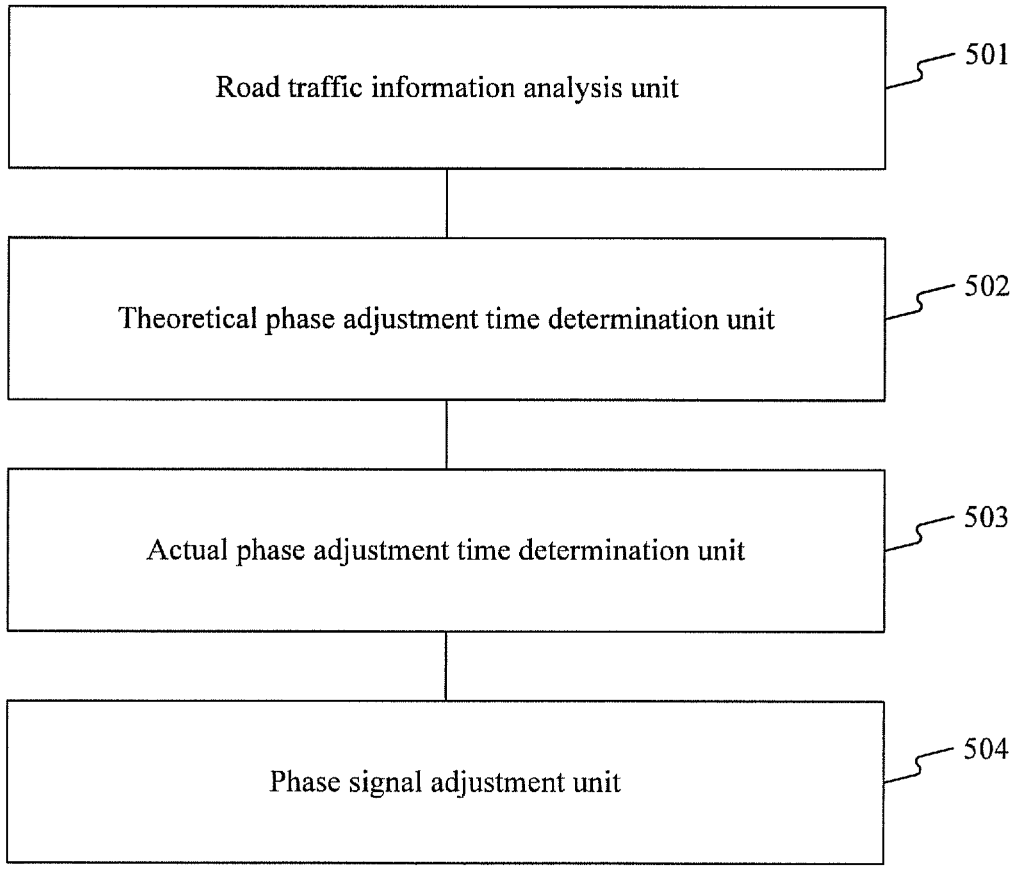
FIG. 5 is a schematic diagram of an exemplary road traffic analysis apparatus, consistent with embodiments of the present disclosure.

Reference is given to FIG. 5 which illustrates a schematic diagram of another exemplary road traffic analysis apparatus, consistent with embodiments of the present disclosure.

The exemplary road traffic analysis apparatus can comprise a road traffic information analysis unit 501, a theoretical phase adjustment time determination unit 502, an actual phase adjustment time determination unit 503, and a phase signal adjustment unit 504.

Road traffic information analysis unit 501 is configured to analyze according to acquired road traffic information of a road intersection to obtain a traffic parameter of the road intersection.

Theoretical phase adjustment time determination unit 502 is configured to determine, based on the road traffic information and the traffic parameter, a theoretical phase adjustment time for each phase signal of each lane of the road intersection in each traffic stream direction.

Actual phase adjustment time determination unit 503 is configured to determine, according to the theoretical phase adjustment times of each lane of the road intersection in each traffic stream direction, an actual phase adjustment time for each phase signal of the road intersection when a difference between the theoretical phase adjustment time and the actual phase adjustment time is at a minimum Phase signal adjustment unit 504 is configured to adjust, according to the actual phase adjustment time for each phase signal of the road intersection, phase signals of the road intersection.

In some embodiments, the theoretical phase adjustment time for each phase signal of the lane is determined according to a product of the difference between an actual travel speed of the upstream road section and an actual travel speed of the downstream road section of the lane times a phase adjustment coefficient.

In some embodiments, one of road traffic information analysis unit 501, theoretical phase adjustment time determination unit 502 or the actual phase adjustment time determination unit 503 are implemented based on a preset phase adjustment model. In addition, the phase adjustment coefficient is obtained through learning and training with the phase adjustment model.

In some embodiments, the sum of actual phase adjustment times for all phase signals of the lane in a single phase cycle equals 0.

In some embodiments, the road traffic information comprises at least one of the following: an actual travel speed of a vehicle traveling at the road intersection, time information corresponding to the actual travel speed, a name of the city to which the road intersection belongs, an identification code of the city, a name of an entrance road section, a name of an exit road section, a name of the road intersection, attributes of the road intersection, a corresponding road node identifier in an electronic map, a sheet number of the road node, a sheet number of the entrance road section, a road section identifier of the entrance road section, a sheet designation of the exit road section, a road section identifier of the exit road section, a road direction of the entrance road section, a road direction of the exit road section, an entrance angle of the entrance road section, an exit angle of the exit road section, and a geographical area where the road intersection is located.

In some embodiments, the traffic parameter comprises at least one of the following: an actual travel speed of the upstream road section of each lane of the road intersection in each traffic stream direction, an actual travel speed of the downstream road section of each lane of the road intersection in each traffic stream direction, a short time granularity to which the actual travel speeds are subordinated, a vehicle travel direction corresponding to the lane, a weekday/weekend corresponding to the short time granularity (e.g. a short time period), total traffic flow of the lane on all weekdays, and total traffic flow of the lane on all weekends. The vehicle travel direction comprises turning left, turning right, going straight and turning around.

In some embodiments, the road traffic analysis apparatus operates based on a pre-established road traffic analysis platform The road traffic analysis platform can include a data acquisition interface for acquiring the road traffic information, a road traffic analysis interface for accessing and outputting the actual phase adjustment time for each phase signal of the road intersection, and a data upload interface for uploading the road traffic information.

In some embodiments, the road traffic information is acquired in at least one of the following ways.

Navigation data of the road intersection can be acquired from a third-party map service provider through the data acquisition interface. The navigation data contains the road traffic information.

Collected road traffic data uploaded by a traffic data collection device provided at the road intersection can be received through the data upload interface. The collected road traffic data contains the road traffic information.

In some embodiments, the road traffic analysis platform adjusts phase signals of the road intersection according to the actual phase adjustment time, output by the road traffic analysis interface, for each phase signal of the road intersection and in combination with an interface protocol corresponding to traffic signal lights provided at the road intersection.

Embodiments of the present disclosure further provides an exemplary electronic device for performing the road traffic analysis method illustrated in FIG. 4, which is described below in FIG. 6 in conjunction with the accompanying drawings.

Figure 6:
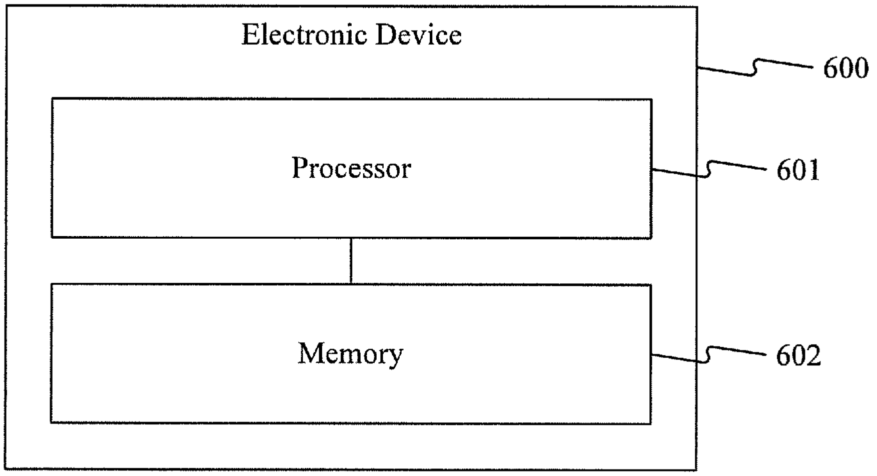
FIG. 6 is a schematic diagram of an exemplary electronic device, consistent with embodiments of the present disclosure.

Reference is given to FIG. 6 which illustrates a schematic diagram of an exemplary electronic device, consistent with embodiments of the present disclosure.

The electronic device (e.g., electronic device 600) can comprise a memory 601, and a processor 602. Memory 601 can store computer executable instructions, and processor 602 is configured to execute the computer executable instructions to cause the electronic device to perform: obtaining a traffic parameter of a road intersection by analyzing road traffic information of the road intersection, determining a traffic unbalance index of road traffic of the road intersection based on the road traffic information and the traffic parameter, and in response to a determination that the traffic unbalance index exceeds a traffic unbalance threshold, identifying the road intersection as an unbalanced intersection with unbalanced road traffic.

In some embodiments, after obtaining a traffic parameter of a road intersection by analyzing road traffic information of the road intersection, and before determining a traffic unbalance index of road traffic of the road intersection based on the road traffic information and the traffic parameter, the road traffic information and the traffic parameter using a data processing algorithm is processed. Before being processed, the road traffic information and the traffic parameter are associated with a first time period, and after being processed, the road traffic information and the traffic parameter are associated with a second time period, the second time period is longer than the first time period.

In some embodiments, after obtaining a traffic parameter of a road intersection by analyzing road traffic information of the road intersection, and before determining a traffic unbalance index of road traffic of the road intersection based on the road traffic information and the traffic parameter, at least one of the road traffic information or the traffic parameter based on a parameter that is related to a structure of the road intersection is optimized. The parameter is contained in at least one of the road traffic information or the traffic parameter.

In some embodiments, determining the traffic unbalance index of road traffic of the road intersection based on the road traffic information and the traffic parameter comprises: determining first unbalance indexes of lanes based on the road traffic information and the traffic parameter, determining second unbalance indexes of traffic stream directions based on the first unbalance indexes of the lanes, and determining the traffic unbalance index of the road intersection based on the second unbalance indexes of the traffic stream directions.

In some embodiments, the first unbalance index of the lane is determined based on a difference between a normalized upstream traffic speed and a normalized downstream traffic speed of the lane. The normalized upstream traffic speed of the lane is obtained by normalizing a traffic speed of the upstream section of the lane, and the normalized downstream traffic speed of the lane is obtained by normalizing a traffic speed of the downstream section of the lane.

In some embodiments, the traffic speed of the upstream road section of the lane is normalized by dividing the traffic speed of the upstream road section of the lane by a reference speed of the lane to obtain the normalized upstream traffic speed of the lane.

In some embodiments, the traffic speed of the downstream road section of the lane is normalized by dividing the traffic speed of the downstream road section of the lane by a reference speed of the lane to obtain the normalized downstream traffic speed of the lane.

In some embodiments, the second unbalance index of the traffic stream direction is determined based on a weighted sum of the first unbalance indexes of all lanes in the traffic stream direction, the weight of the weighted sum being a proportion that traffic volume of each lane accounts for in traffic volume of all lanes having the same direction.

In some embodiments, determining the traffic unbalance index of the road intersection based on the second unbalance indexes of the traffic stream directions comprises: determining a traffic unbalance index of the road intersection based on weighted sums of the second unbalance indexes of all traffic stream directions having a same phase in a phase cycle of the road intersection along with a sum of absolute values of the weighted sums. The weight of the second unbalance index is a proportion that the traffic volume of each traffic stream direction accounts for in traffic volume of all traffic directions having the same phase.

In some embodiments, determining the traffic unbalance index of the road intersection according to the second unbalance indexes of the traffic stream directions comprises one of: determining the traffic unbalance index of the road intersection based on the sum of absolute values of second unbalance indexes of all traffic stream directions of the road intersection, each traffic direction having opposite phase signals in a phase cycle of the road intersection, or determining the traffic unbalance index of the road intersection according to a weighted sum of second unbalance indexes of all traffic stream directions having opposite phase signals in a phase cycle of the road intersection, wherein the weight of the weighted sum of the second unbalance index is a proportion that traffic volume of each traffic direction accounts for in total traffic volume of the road intersection.

In some embodiments, the road traffic information comprises at least one of: a travel speed of a vehicle traveling at the road intersection, time information corresponding to the travel speed, a name of the city to which the road intersection belongs, an identification code of the city, a name of an entrance road section, a name of an exit road section, a name of the road intersection, attributes of the road intersection, a road node identifier in an electronic map, a sheet number of the road node, a sheet number of the entrance road section, a road section identifier of the entrance road section, a sheet number of the exit road section, a road section identifier of the exit road section, a road direction of the entrance road section, a road direction of the exit road section, an entrance angle of the entrance road section, an exit angle of the exit road section, and a geographical area where the road intersection is located.

In some embodiments, the traffic parameter comprises at least one of: a traffic speed of the upstream road section of each lane in each traffic stream direction at the road intersection, a traffic speed of the downstream road section of each lane in each traffic stream direction at the road intersection, a first time period associated with each travel speed, a vehicle travel direction of the lane, one of a weekday or a weekend corresponding to the first time period, total traffic volume of the lane on all weekdays, and total traffic volume of the lane on all weekends. The vehicle travel direction comprises turning left, turning right, going straight and turning around.

In some embodiments, in response to a determination that the traffic unbalance index does not exceed the traffic unbalance threshold, obtaining a traffic parameter of a road intersection that has not been identified in a traffic network containing at least one road intersection by analyzing road traffic information of the road intersection.

In some embodiments, after identifying the road intersection as an unbalanced intersection with unbalanced road traffic, a reference adjustment length for each phase of each lane in each direction of the road intersection is determined based on at least one of the road traffic information or the traffic parameter, and a first adjustment length that is assigned as a second adjustment length is determined when a difference between the reference adjustment length and the second adjustment length is at a minimum, and the phases at the road intersection are adjusted based on the first adjustment length for each phase of the road intersection.

In some embodiments, the reference adjustment length for each phase of the lane is determined based on a product of a speed difference times a phase adjustment coefficient, the speed difference being a difference between a traffic speed of the upstream road section and a traffic speed of the downstream road section of the lane.

In some embodiments, at least one of the reference adjustment length or the first adjustment length is determined based on a phase adjustment model, and the phase adjustment coefficient is obtained through learning and training with the phase adjustment model.

In some embodiments, a sum of the first adjustment length of each phase in a phase cycle for the lane equals 0.

In some embodiments, a road traffic analysis platform includes a data acquisition interface for acquiring the road traffic information, a road traffic analysis interface for accessing and outputting the first adjustment length for each phase of the road intersection, and a data upload interface for uploading the road traffic information.

In some embodiments, the road traffic information is acquired from at least one of navigation data of the road intersection or road traffic data, the navigation data is acquired from a third-party map service provider through the data acquisition interface, and the road traffic data is received through the data upload interface and uploaded by a traffic data collection device provided at the road intersection.

In some embodiments, the road traffic analysis platform adjusts the phases at the road intersection based on the first adjustment length received from the road traffic analysis interface for each phase at the road intersection, and an interface protocol of traffic signal lights at the road intersection.

Processor 602 can also be configured to execute the computer executable instructions to cause the electronic device to perform: obtaining a traffic parameter of the road intersection by analyzing road traffic information of a road intersection, determining a reference adjustment length for each phase of each lane in each direction of the road intersection based on road traffic information and the traffic parameter, determining, a first adjustment length assigned as a second adjustment length when a difference between the reference adjustment length and the second adjustment length is at a minimum, and adjusting the phases at the road intersection based on the first adjustment length for each phase of the road intersection.

In some embodiments, the reference adjustment length for each phase of the lane is determined based on a product of a speed difference times a phase adjustment coefficient, the speed difference being a difference between a traffic speed of the upstream road section and a traffic speed of the downstream road section of the lane.

In some embodiments, at least one of the reference adjustment length or the first adjustment length is determined based on a phase adjustment model, and the phase adjustment coefficient is obtained through learning and training with the phase adjustment model.

In some embodiments, a sum of actual phase adjustment times for all phase signals of the lane in a single phase cycle equals 0.

In some embodiments, adjusting the phases at the road intersection based on the first adjustment length for each phase of the road intersection comprises: determining a traffic unbalance index of road traffic of the road intersection based on the road traffic information and the traffic parameter, in response to a determination that the traffic unbalance index exceeds a traffic unbalance threshold, identifying the road intersection as an unbalanced intersection with unbalanced road traffic, and in response to the road intersection being identified as the unbalanced intersection, adjusting the phases at the road intersection based on the first adjustment length for each phase of the road intersection.

In some embodiments, determining the traffic unbalance index of road traffic of the road intersection based on the road traffic information and the traffic parameter comprises: determining first unbalance indexes of lanes based on the road traffic information and the traffic parameter, determining second unbalance indexes of traffic stream directions based on the first unbalance indexes of the lanes, and determining the traffic unbalance index of the road intersection based on the second unbalance indexes of the traffic stream directions.

In some embodiments, the first unbalance index of the lane is determined based on a difference between a normalized upstream traffic speed and a normalized downstream traffic speed of the lane, the normalized upstream traffic speed of the lane is obtained by normalizing a traffic speed of the upstream section of the lane, and the normalized downstream traffic speed of the lane is obtained by normalizing a traffic speed of the downstream section of the lane.

In some embodiments, the second unbalance index of the traffic stream direction is determined based on a weighted sum of the first unbalance indexes of all lanes in the traffic stream direction, the weight of the weighted sum being a proportion that traffic volume of each lane accounts for in traffic volume of all lanes having the same direction.

In some embodiments, determining the traffic unbalance index of the road intersection based on the second unbalance indexes of the traffic stream directions comprises: determining the traffic unbalance index of the road intersection based on weighted sums of the second unbalance indexes of all traffic stream directions having a same phase in a phase cycle of the road intersection along with a sum of absolute values of the weighted sums. The weight of the second unbalance index is a proportion that the traffic volume of each traffic stream direction accounts for in traffic volume of all traffic directions having the same phase.

In some embodiments, the road traffic information comprises at least one of: a travel speed of a vehicle traveling at the road intersection, time information corresponding to the travel speed, a name of the city to which the road intersection belongs, an identification code of the city, a name of an entrance road section, a name of an exit road section, a name of the road intersection, attributes of the road intersection, a road node identifier in an electronic map, a sheet number of the road node, a sheet number of the entrance road section, a road section identifier of the entrance road section, a sheet number of the exit road section, a road section identifier of the exit road section, a road direction of the entrance road section, a road direction of the exit road section, an entrance angle of the entrance road section, an exit angle of the exit road section, and a geographical area where the road intersection is located.

In some embodiments, the traffic parameter comprises at least one of the following: a traffic speed of the upstream road section of each lane in each traffic stream direction at the road intersection, a traffic speed of the downstream road section of each lane in each traffic stream direction at the road intersection, a first time period associated with each travel speed, a vehicle travel direction of the lane, one of a weekday or a weekend corresponding to the first time period, total traffic volume of the lane on all weekdays, and total traffic volume of the lane on all weekends. The vehicle travel direction comprises turning left, turning right, going straight and turning around.

In some embodiments, a road traffic analysis platform includes a data acquisition interface for acquiring the road traffic information, a road traffic analysis interface for accessing and outputting the first adjustment length for each phase of the road intersection, and a data upload interface for uploading the road traffic information.

In some embodiments, the road traffic information is acquired from at least one of navigation data of the road intersection or road traffic data, the navigation data is acquired from a third-party map service provider through the data acquisition interface, and the road traffic data is received through the data upload interface and uploaded by a traffic data collection device provided at the road intersection.

In some embodiments, the road traffic analysis platform adjusts the phases at the road intersection based on the first adjustment length received from the road traffic analysis interface for each phase at the road intersection, and an interface protocol of traffic signal lights at the road intersection.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In a typical configuration, a computing device comprises one or more central processing units (CPU), an input/output interface, a network interface, and a memory.

The memory can include a computer-readable medium such as a non-persistent memory, a Random Access Memory (RAM), or a non-volatile memory, e.g., a Read-Only Memory (ROM) or a flash RAM. The memory is an example of a computer-readable medium.

The computer readable medium can include a persistent medium and a non-persistent medium as well as a removable medium and a non-removable medium, and can store information. The information can be a computer-readable instruction, a data structure, a module of a program, or other data. An example of the storage medium of a computer includes, but is not limited to, a phase change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition herein, the computer-readable medium does not include computer-readable transitory media, such as modulated data signals and carriers.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

It is appreciated that all or some of the procedures in the methods of the foregoing embodiments can be implemented on hardware only, software only, or software and hardware combined, and can also be implemented by a program instructing relevant hardware components of a device (for example, Electronic Device 600 shown in FIG. 6). The program can be stored in a computer readable storage medium. The storage medium includes a flash memory, a Read-Only Memory (ROM), a Random Access Memory (RAM), a magnetic disk, or an optical disc.

What is claimed is:

1. A road traffic analysis method, comprising:

obtaining a traffic parameter of a road intersection by analyzing road traffic information of the road intersection;

determining a plurality of unbalance indexes based on the road traffic information and the traffic parameter, the plurality of unbalance indexes comprising first unbalance indexes of lanes;

determining second unbalance indexes of traffic stream directions based on the first unbalance indexes of the lanes;

determining a traffic unbalance index of the road intersection based on the second unbalance indexes of the traffic stream directions; and in response to a determination that the traffic unbalance index satisfies a traffic unbalance threshold, identifying the road intersection as an unbalanced intersection with unbalanced road traffic.

2. The road traffic analysis method according to claim 1, wherein the first unbalance index of the lane is determined based on a difference between a normalized upstream traffic speed and a normalized downstream traffic speed of the lane, the normalized upstream traffic speed of the lane is obtained by normalizing a traffic speed of the upstream section of the lane, and the normalized downstream traffic speed of the lane is obtained by normalizing a traffic speed of the downstream section of the lane.

3. The road traffic analysis method according to claim 1, wherein the second unbalance index of the traffic stream direction is determined based on a weighted sum of the first unbalance indexes of all lanes in the traffic stream direction, the weight of the weighted sum being a proportion that traffic volume of each lane accounts for in traffic volume of all lanes having the same direction.

4. The road traffic analysis method according to claim 1, wherein determining the traffic unbalance index of the road intersection based on the second unbalance indexes of the traffic stream directions comprises:

determining a traffic unbalance index of the road intersection based on weighted sums of the second unbalance indexes of all traffic stream directions having a same phase in a traffic signal cycle of the road intersection along with a sum of absolute values of the weighted sums, wherein the traffic signal cycle has one or more phases;

wherein the weight of the second unbalance index is a proportion that the traffic volume of each traffic stream direction accounts for in traffic volume of all traffic directions having the same phase.

5. The road traffic analysis method according to claim 1, further comprising:

after identifying the road intersection as an unbalanced intersection with unbalanced road traffic, determining, based on at least one of the road traffic information or the traffic parameter, a reference adjustment length for each phase of each lane of the road intersection;

determining a first adjustment length when a difference between the reference adjustment length and the first adjustment length satisfies a condition associated with the lanes of the road intersection and the corresponding traffic parameter; and adjusting the phases of the traffic light cycle at the road intersection based on the first adjustment length for each phase.

6. The road traffic analysis method according to claim 5, wherein the reference adjustment length for each phase of the lane is determined based on a product of a speed difference times a phase adjustment coefficient, the speed difference being a difference between a traffic speed of the upstream road section and a traffic speed of the downstream road section of the lane.

7. The road traffic analysis method according to claim 6, wherein at least one of the reference adjustment length or the first adjustment length is determined using a phase adjustment model, and the phase adjustment coefficient is obtained through learning and training with the phase adjustment model.

8. The road traffic analysis method according to claim 5, wherein a sum of the first adjustment length of each phase in a phase cycle for the lane in the traffic signal cycle equals 0.

9. A road traffic analysis apparatus comprising:

a memory storing a set of instructions; and one or more processors configured to execute the set of instruction to cause the apparatus to perform:

obtaining a traffic parameter of a road intersection by analyzing road traffic information of the road intersection, determining a plurality of unbalance indexes based on the road traffic information and the traffic parameter, the plurality of unbalance indexes comprising first unbalance indexes of lanes, determining second unbalance indexes of traffic stream directions based on the first unbalance indexes of the lanes;

determining a traffic unbalance index of the road intersection based on the second unbalance indexes of the traffic stream directions, and in response to a determination that the traffic unbalance index satisfies a traffic unbalance threshold, identifying the road intersection as an unbalanced intersection with unbalanced road traffic.

10. The road traffic analysis apparatus according to claim 9, wherein the one or more processors are configured to execute the set of instructions to cause the apparatus to further perform:

after identifying the road intersection as an unbalanced intersection with unbalanced road traffic, determining, based on at least one of the road traffic information or the traffic parameter, a reference adjustment length for each phase of each lane of the road intersection;

determining a first adjustment length when a difference between the reference adjustment length and the first adjustment length satisfies a condition associated with the lanes of the road intersection and the corresponding traffic parameter; and adjusting the phases of the traffic light cycle at the road intersection based on the first adjustment length for each phase.

11. A non-transitory computer readable medium that stores a set of instructions that is executable by at least one processor of a computer to cause the computer to perform a road traffic analysis method, the method comprising:

obtaining a traffic parameter of a road intersection by analyzing road traffic information of the road intersection;

determining a plurality of unbalance indexes based on the road traffic information and the traffic parameter, the plurality of unbalance indexes comprising first unbalance indexes of lanes;

determining second unbalance indexes of traffic stream directions based on the first unbalance indexes of the lanes;

determining a traffic unbalance index of the road intersection based on the second unbalance indexes of the traffic stream directions; and in response to a determination that the traffic unbalance index satisfies a traffic unbalance threshold, identifying the road intersection as an unbalanced intersection with unbalanced road traffic.

12. The non-transitory computer readable medium according to claim 11, wherein the first unbalance index of the lane is determined based on a difference between a normalized upstream traffic speed and a normalized downstream traffic speed of the lane, the normalized upstream traffic speed of the lane is obtained by normalizing a traffic speed of the upstream section of the lane, and the normalized downstream traffic speed of the lane is obtained by normalizing a traffic speed of the downstream section of the lane.

13. The non-transitory computer readable medium according to claim 11, wherein the second unbalance index of the traffic stream direction is determined based on a weighted sum of the first unbalance indexes of all lanes in the traffic stream direction, the weight of the weighted sum being a proportion that traffic volume of each lane accounts for in traffic volume of all lanes having the same direction.

14. The non-transitory computer readable medium according to claim 11, wherein determining the traffic unbalance index of the road intersection based on the second unbalance indexes of the traffic stream directions comprises:

determining a traffic unbalance index of the road intersection based on weighted sums of the second unbalance indexes of all traffic stream directions having a same phase in a traffic signal cycle of the road intersection along with a sum of absolute values of the weighted sums, wherein the traffic signal cycle has one or more phases;

wherein the weight of the second unbalance index is a proportion that the traffic volume of each traffic stream direction accounts for in traffic volume of all traffic directions having the same phase.

15. The non-transitory computer readable medium according to claim 11, wherein the set of instructions that are executable by the at least one processor of a computer to cause the computer to further perform:

after identifying the road intersection as an unbalanced intersection with unbalanced road traffic, determining, based on at least one of the road traffic information or the traffic parameter, a reference adjustment length for each phase of each lane of the road intersection;

determining a first adjustment length when a difference between the reference adjustment length and the first adjustment length satisfies a condition associated with the lanes of the road intersection and the corresponding traffic parameter; and adjusting the phases of the traffic light cycle at the road intersection based on the first adjustment length for each phase.

16. The non-transitory computer readable medium according to claim 15, wherein the reference adjustment length for each phase of the lane is determined based on a product of a speed difference times a phase adjustment coefficient, the speed difference being a difference between a traffic speed of the upstream road section and a traffic speed of the downstream road section of the lane.

17. The non-transitory computer readable medium according to claim 16, wherein at least one of the reference adjustment length or the first adjustment length is determined using a phase adjustment model, and the phase adjustment coefficient is obtained through learning and training with the phase adjustment model.

18. The non-transitory computer readable medium according to claim 15, wherein a sum of the first adjustment length of each phase in a phase cycle for the lane in the traffic signal cycle equals 0.

* * * * *